Aug. 27, 1940.	E. L. NOBLE ET AL	2,212,716
WHEEL AND TIRE REPLACING TOOL
Filed March 15, 1937
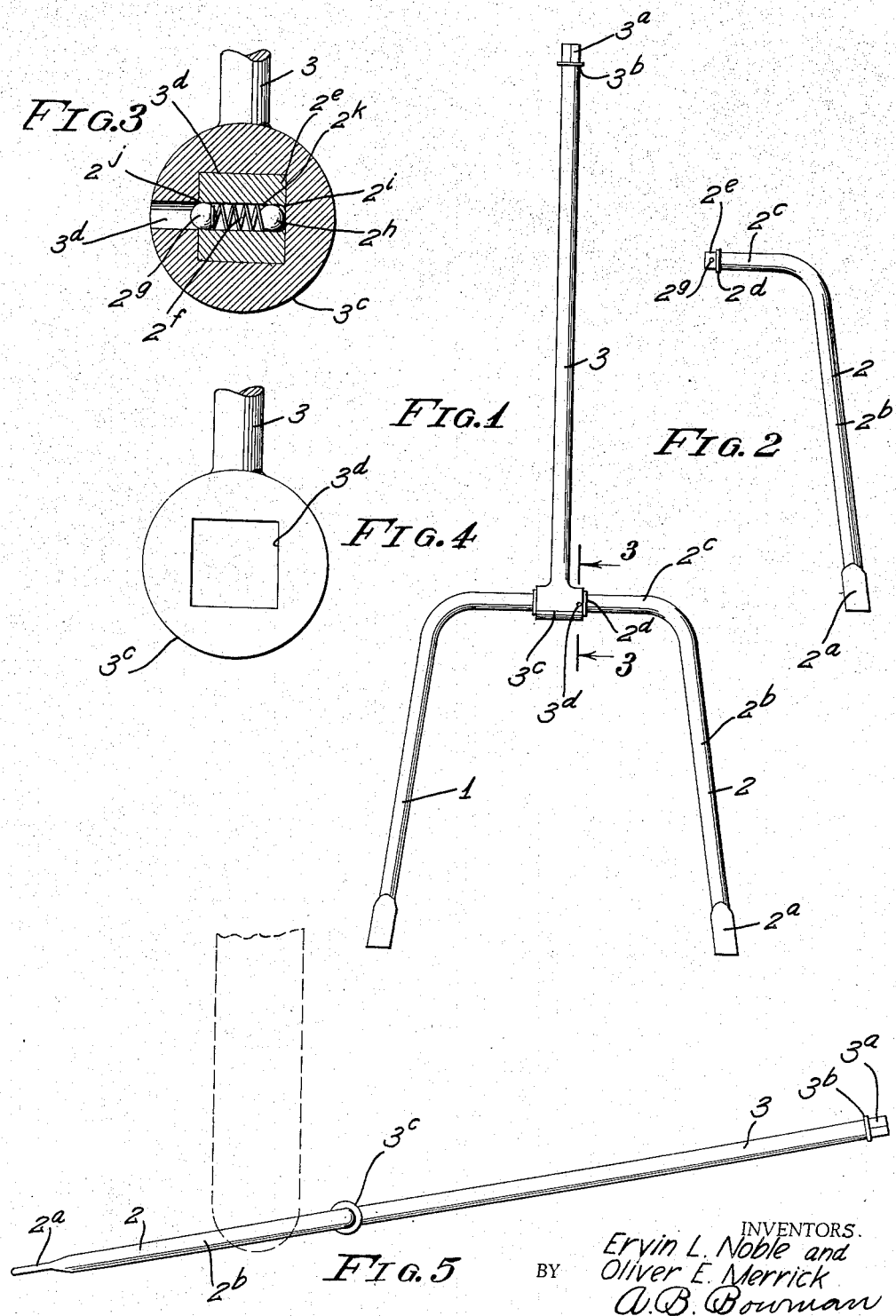
INVENTORS.
Ervin L. Noble and
Oliver E. Merrick
BY A. B. Bowman
ATTORNEY.

Patented Aug. 27, 1940

2,212,716

UNITED STATES PATENT OFFICE 2,212,716

WHEEL AND TIRE REPLACING TOOL

Ervin L. Noble and Oliver E. Merrick, Ramona, Calif.

Application March 15, 1937, Serial No. 130,934

4 Claims. (Cl. 254—131)

Our invention relates to a wheel and tire replacing tool, particularly adapted for placing heavy truck wheels in position when changing tires. The objects of our invention are:

First, to provide a wheel and tire replacing tool which provides a prong-like lever adapted to fit under the tire of a wheel and provided with an extended handle portion to provide leverage for raising the wheel to be placed in position and securing it to the wheel support of the vehicle;

Second, to provide a tool of this class which may be quickly taken apart and some of the parts used for placing the tire on the rim or for a wrench;

Third, to provide a tool of this class which may be readily and easily applied to the wheel of a vehicle for raising it into position in replacing the same;

Fourth, to provide a tool of this class which may be readily taken apart for placing in compact form for carrying the same;

Fifth, to provide a tool of this class in which the operating handle may be used as a wrench; and Sixth, to provide a tool of this class which is very simple and economical of construction, easy to operate, easy to apply, efficient in its action, and which will not readily deteriorate or get out of order.

With these and other objects in view as will appear hereinafter, our invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a side elevational view of our wheel and tire replacing tool when placed in upright position; Fig. 2 is a similar elevational view of one of the prong members in detached relation with the remainder of the tool; Fig. 3 is an enlarged sectional view on the line 3—3 of Fig. 1; Fig. 4 is a fragmentary side view of one end of the handle member with one of the prongs removed shown on an enlarged scale and Fig. 5 is a side elevational view of the tool in assembled relation shown in position for raising a wheel, which wheel is shown by dotted lines.

Similar characters of reference refer to similar parts and portions throughout the several views of the drawing:

The prong members 1 and 2 and handle member 3 constitute the principal parts and portions of our wheel and tire replacing tool. The handle member 3 is a long round bar provided at one end with a square portion 3a and with an extending flange 3b at the intersection of the square portion 3a with the round portion of the handle. This handle 3 is provided at its opposite end with a right angle hollow cylindrical portion 3c, the hollow portion being square as shown best in Fig. 4 of the drawing. Mounted in these square openings 3d are the square ends of the prong members 1 and 2. These prong members 1 and 2 are substantially duplicates, the member 2 being provided with a flat end portion 2a and with a straight round portion 2b and with a portion 2c at an obtuse angle from the portion 2b. It is provided with a flange 2d spaced from its end and intermediate said flange and the end is provided with a square portion 2e. In this square portion 2e is provided a hole 2k in which is mounted a spring member 2f, and at opposite ends of this spring member are provided ball members 2g and 2h, the square portion being beaded at 2i and 2j at the opposite sides for holding the ball members 2g and 2h in the hole 2k when the member 2 is removed from the socket portion 3c of the handle member 3, it being noted that the member 1 is constructed in the same way. The socket member 3 is provided with holes 3d, which are adapted to permit one of the ball members to protrude for latching the members 1 and 2 for position in the socket member 3, all as shown best in Fig. 3 of the drawing.

The operation of our wheel and tire replacing tool is as follows: The tool in its assembled relation as shown in Fig. 1 of the drawing is placed with one prong on each side of the vertical axis of the wheel. Then the wheel is raised by taking hold of the handle 3 and by raising the tool the wheel assumes an angular relation therewith and slips down into position against the wheel and the supporting bolts are easily entered into the holes of the wheel hub, after which the tool may be dropped and the wheel pressed in position. The members 1 and 2 may be readily withdrawn from the socket 3c causing the ball member 2g to compress the spring 2f sufficient to permit the withdrawal. These members 1 and 2 may be used for tire tools for placing the tire on the rim or for other purposes desired, or may be used as a wrench, the square portion forming an internal wrench and the handle may be used for an external wrench while the opposite end 3a may be used as an internal wrench and the members 1 and 2 in assembled relation may be used as a handle for the wrench, thus providing a handy complete wheel and tire replacing tool.

Though we have shown and described a particular construction, combination, and arrangement of parts and portions, we do not wish to be limited to this particular construction, combination, and arrangement, but desire to include in the scope of our invention, the construction, combination, and arrangement substantially as set forth in the appended claims.

Having thus described our invention, what we claim as new and desire to secure by Letters Patent is:

1. In a wheel and tire replacing tool, a handle member provided with an integral socket member at right angles thereto at one end provided with opposed polygon shaped socket portions and a pair of prong members readily removably secured in said socket member and extending in opposite directions therefrom provided with polygon ends conforming to said socket portions and adapted to fit therein.

2. In a wheel and tire replacing tool, a handle member provided with an integral socket member at right angles thereto at one end, provided with opposed polygon shaped socket portions, a pair of prong members readily removably secured in said socket member and extending in opposite directions therefrom provided with polygon ends conforming to said socket portions and adapted to fit therein, each of said prong members having flattened ends.

3. In a wheel and tire replacing tool, a handle member provided with an integral socket member at right angles thereto at one end, provided with opposed polygon shaped socket portions, a pair of prong members readily removably secured in said socket member and extending in opposite directions therefrom provided with polygon ends conforming to said socket portions and adapted to fit therein, said prong members being provided with latches in their ends which engage the side walls of said socket member for latching said prong members in said socket.

4. A wheel replacing tool consisting of a handle member provided with an integral polygon socket member with its axis at right angles to said handle and a pair of readily removable prong members with polygon ends adapted to fit in said sockets and extend in opposite directions, each of said prong members being bent intermediate their ends whereby the extended ends of said prong members are nearly parallel with said handle member, and latch means in connection with said prong member and socket member for latching said prong members in said socket member.

ERVIN L. NOBLE.
OLIVER E. MERRICK.